United States Patent [19]

Briscoe

[11] 4,337,614

[45] Jul. 6, 1982

[54] PIN LOCKING ASSEMBLY

[75] Inventor: Terry L. Briscoe, Portland, Oreg.

[73] Assignee: ESCO Corporation, Portland, Oreg.

[21] Appl. No.: 122,593

[22] Filed: Feb. 19, 1980

[51] Int. Cl.$^3$ ............................................. F16G 15/06
[52] U.S. Cl. .......................................... 59/86; 411/518
[58] Field of Search ........................ 59/84, 85, 86, 93;
411/516–519, 521

[56] References Cited

U.S. PATENT DOCUMENTS

| 1,652,272 | 12/1927 | Dawson | 411/519 |
| 2,124,912 | 7/1938 | Ehmann | 411/98 X |
| 3,811,270 | 5/1974 | Smith | 59/86 |
| 4,221,252 | 9/1980 | Bruce | 59/86 X |

Primary Examiner—Mark Rosenbaum
Assistant Examiner—Timothy V. Eley
Attorney, Agent, or Firm—Tilton, Fallon, Lungmus & Chestnut

[57] ABSTRACT

A pin locking assembly for a shackle or the like wherein a pin is non-rotatably mounted in a member and is equipped with a plate rotatably mounted on one pin end for movement between removable and non-removable positions, and removable lock means releasably fixing the plate in non-removable position relative to the pin.

10 Claims, 5 Drawing Figures

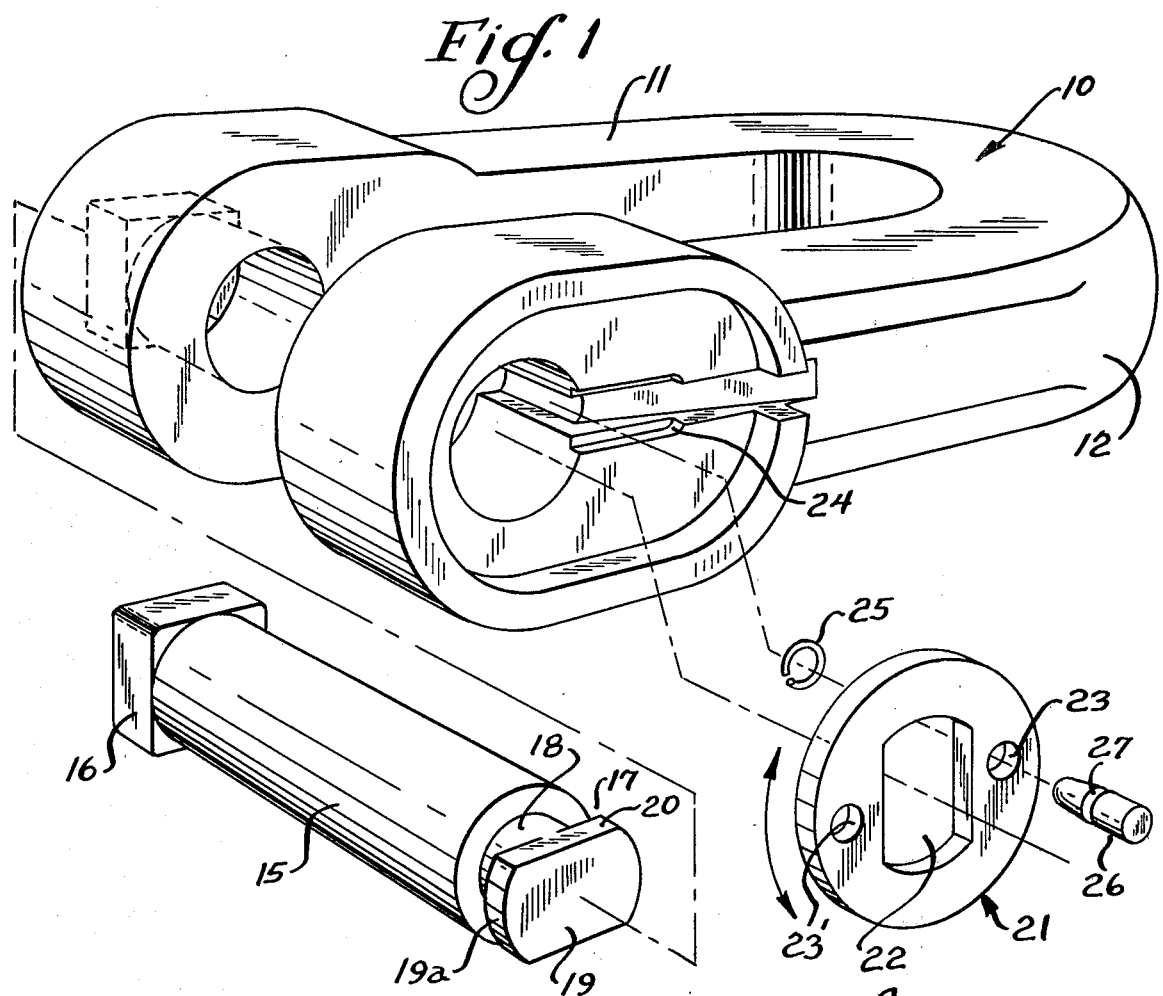
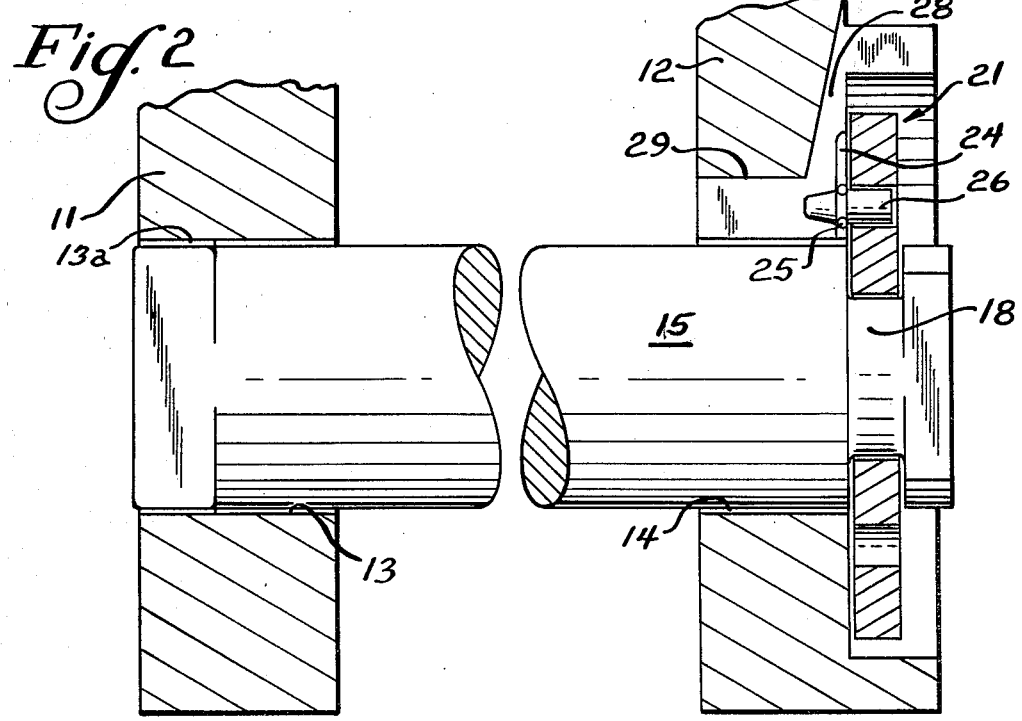

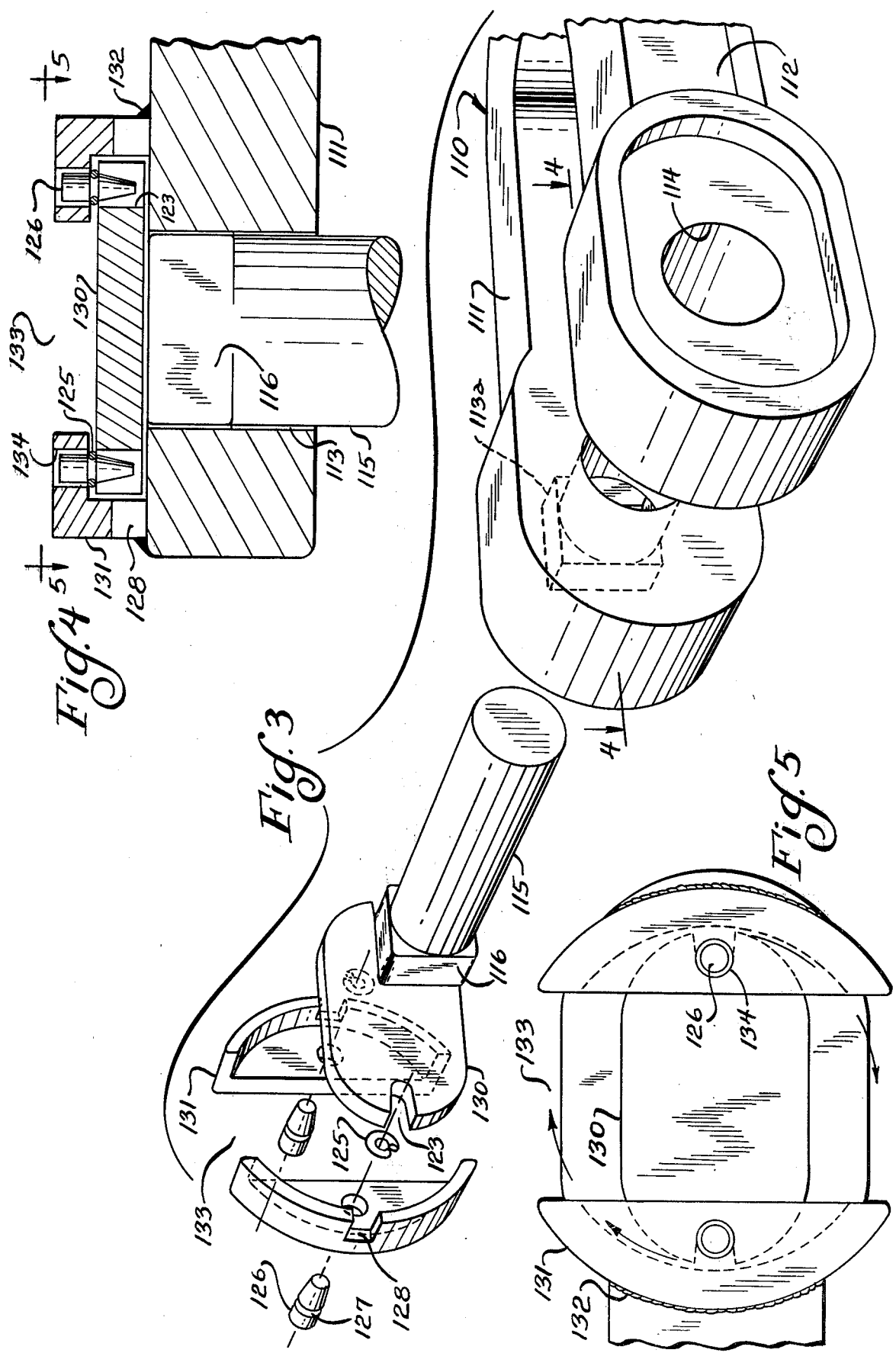

PIN LOCKING ASSEMBLY

BACKGROUND AND SUMMARY OF INVENTION

This invention relates to a pin locking assembly and, more particularly, to an assembly that permits quick change by easy removal of the pin while maintaining a positive connection between the pin and associated member at other times.

Exemplary of but not limited to the use of the invention is in connection with shackles, i.e., U-shaped members providing a pair of legs equipped with aligned openings. Shackles are used in many environments and one illustrative environment is in connection with the chains associated with excavating equipment such as dragline buckets. In this environment and many others, a dilemma has arisen between the need for providing a positive lock on the shackle or other pin-equipped member so that the same will not become detached during operation while at the same time providing a structure that is easily and quickly disassembled for change. A wide variety of expedients have been adopted in the past for temporarily but releasably locking shackles and illustrative of these expedients are co-owned U.S. Pat. Nos. 2,124,912 and 3,811,270. In these representations of the prior art and most others, the ability for quick change or detachment has been sacrificed in the interest of having a positive lock, i.e., using deformable keepers for the pin, complicated interlocks subject to stress, and the like. This dilemma has been solved by the instant invention and through the provision of a novel assembly wherein the locking parts are not subject to unusual deforming stresses.

According to the invention, a pin is mounted within opening means within a member in a fashion whereby the pin is prevented from moving axially. Associated with the pin is a plate rotatably mounted adjacent one pin end for movement between removable and non-removable positions—along with removable lock means releasably fixing the plate in the non-removable position.

Other features, details and advantages of the invention can be seen in the ensuing specification.

DETAILED DESCRIPTION

The invention is described in conjunction with an illustrative embodiment, in which FIG. 1 is a perspective, exploded view showing the various parts of the pin locking assembly;

FIG. 2 is an enlarged fragmentary sectional view of the parts of FIG. 1 when the same are in assembled condition;

FIG. 3 is a perspective, exploded view of a modified form of the invention;

FIG. 4 is an enlarged, fragmentary sectional view such as would be seen along the sight line 4—4 of FIG. 3; and FIG. 5 is a fragmentary end view such as would be seen along the sight line 5—5 applied to FIG. 4.

In the illustration given, the numeral 10 designates generally a shackle or similar U-shaped member providing a first leg 11 and a second leg 12. In the illustration given, the first leg 11 has an opening 13 extending therethrough which is aligned with an opening 14 in the second leg 12 for the receipt of a pin 15. It will be immediately apparent to those skilled in the art that the shackle member 10 may be modified widely while still retaining the advantages of the pin locking system, i.e., a variety of opening means substituted for the aligned openings 13 and 14 illustrated in the preferred embodiment.

The pin 15 is seen to have a head 16 at one end thereof which, in the illustration given, is typical but not limited to being square-shaped. The opening 13 is similarily contoured, i.e., square-shaped in the portion 13a thereof while the remaining portion of the opening is circular in contour so as to conform to the generally cylindrical contour of the pin 15. Through this cooperating means between the shackle 10 and the pin 15, rotation of the pin about its axis is prevented.

The other pin end as at 17 (see FIG. 1) is equipped with an integral neck portion 18 of a diameter reduced relative to the diameter of the main portion of the cylindrical pin 15. At the end 17 of the pin 15, the neck 18 merges into an integral zonal portion 19. The zonal portion 19 is defined by arcuate perimeter portions at 19a which have radii corresponding to that of the generally cylindrical main portion of the pin 15 but which zonal portions are flanked or interrupted by flat surfaces 20 so as to accommodate the slidable receipt of an apertured plate generally designated 21.

The plate 21 is centrally apertured as at 22 so that the plate may be slidably passed over the zonal portion 19 into mounting relation with the neck 18 in the fashion seen in FIG. 2. Thereafter, to complete the positive locking action, the plate 21 is rotated 90° (in the illustration given) as indicated by the double ended arcuate arrow applied to FIG. 1. This results in the zonal portion 19 blocking the removal of the plate 21 and simultaneously orients a second aperture 23 in alignment with a ring supporting slot 24 provided on the leg 12. For assembly, a snap ring 25 is mounted in the slot 24 and a lug 26 is passed through the aperture 23 and through the ring 25, ultimately receiving the ring 25 within a groove 27.

In the operation of the shackle or other opening means-providing member, any shock or stress tending to remove the pin 15 from the member 10 is resisted by the coaction of the zonal portion 19 and the plate 21. Inasmuch as the plate 21 can be of relatively rugged construction, the resistance to inadvertent removal of the pin 15 is increased and without affecting the lock means 23, 25–27 which maintains the plate in non-removable position.

It will be appreciated that the inventive structure of FIGS. 1 and 2 can be used in any application where there is a pin whose head is restricted from turning and also holds the pin in one direction parallel to the axis thereof, utilizing a locking system to keep the pin from moving in the opposite direction. For assembly, the pin 15 is installed in the openings 13, 14 with the flats of the head 16 conforming to the flats provided at 13a in the first leg 11. Thereafter the snap ring 25 is slipped into the slot or groove 24 alongside of the pin 15. Next, the plate 21 is slipped over the end 17 of the pin 15 with the flat side of the aperture 22 parallel to the flats 20 on the zonal portion 19 of the pin end 17. Now by rotating the plate 21 90° either clockwise or counterclockwise, the second aperture of lug hole 23 (or 23') is lined up with the snap ring 25. Thereafter the locking lug 26 is driven through the lug hole 23 and through the snap ring 25 until the snap ring 25 is seated in the groove 27 on the lug 26. This locks the plate 21 in place so that it cannot rotate and the pin cannot pull out through the locking plate.

Two ways are provided for removal of the lock lug 26. One is to insert a tapered wedge type of tool in the tapered passage 28 to pry or push the lug 26 back through the snap ring 25 and aperture 23. Alternatively, the lug 26 can be driven through the aperture 23 and into a passage extension 29 so as to be removed from the inside end of the opening 14.

It will be appreciated that a significant advantage of the inventive pin locking assembly is that no welding is required to assemble the lock, no burning required to remove the lock and that the lock is reusable.

For those installations already in the field and for which the advantages of the invention are desired to be used, the arrangement of FIGS. 3-5 may be employed. There, the numeral 110 designates a shackle or similar member providing a first leg 111 and a second leg 112. In describing this embodiment of the invention, numerals corresponding to those of the first illustrated embodiment will be employed as much as possible (augmented by 100). As before, the leg 111 (see FIG. 4) is equipped with an opening 113 aligned with the opening 114 in the leg 112—these for the receipt of the pin 115.

Again, the pin 115 is seen to have a head 116 at one end thereof to be slidably received within a correspondingly shaped portion 113a of the opening 113 and thereby limit the pin 115 against axial movement.

In this embodiment of the invention, inadvertent removal of the pin 115 is prevented by means of the obround plate 130. As can be best seen in FIG. 3, the plate 130 has semicircular end portions connected by a straight integral central portion. The plate is adapted to abut the head end of the pin 115 and prevent the same from being removed axially. For this purpose, a pair of wall portions 131 are provided which can be weldably secured as at 132 to the leg 111. The wall portions 131 are zonal in character, having an arcuate contour corresponding to the contour of the semicircular ends of the plate 130. The wall portions 131 are constructed so that when installed so as to confine the plate 130 in the configuration depicted in FIG. 5, a spacing 133 exists between the two wall portions 131.

In operation, the wall portions 131 are secured by the welds 132 in the fashion depicted in FIG. 4 after which the plate 130 is disposed so as to fit within the spacing 133 and thereafter be rotated to non-removable position, i.e., through 90°. Removal of the plate 130 is achieved by a similar 90° removal as indicated by the arrows seen in FIG. 5.

For releasably locking the plate 130 in non-removable condition, each wall portion 131 is equipped with an opening 134 for the receipt of a lug 126. The plate 130, in the ends thereof, is equipped with apertures or notches 123 to accommodate insertion of the lugs 126. The lugs 126 are equipped with grooves 127 (see the left hand portion of FIG. 3) for the receipt of snap rings 125 in the fashion illustrated in FIG. 4.

In the operation of this embodiment of the invention, the snap ring or rings 125 are placed in position within the wall portions 131 and the plate 130 inserted and turned as previously described. Thereafter, the lugs 126 are pushed through the openings 134, through the snap rings 125 and received within the apertures 123 as illustrated in FIG. 4. For removal, it is only necessary to insert a screwdriver or like prying tool into the passage 128 so as to engage the inner end of the lug 126.

While in the foregoing specification a detailed description of an embodiment of the invention has been set for the purpose of illustration, many variations in the details hereingiven may be made by those skilled in the art without departing from the spirit and scope of the invention.

I claim:

1. A pin locking assembly for a shackle comprising a leg-equipped shackle providing aligned openings in the legs thereof for receipt of a pin, a pin mounted in said openings by axial movement into said openings, a recess in one of said legs communicating with the opening therein and accessible from the outside, a plate positioned in said recess preventing axial movement of said pin, said plate being rotatable in said recess from removable to non-removable positions, lug means extending axially through said plate releasably maintaining said plate in said non-removable position and against rotation, passage means in said member for pryingly removing said lug means, and means operably associated with said assembly for confining said plate against axial movement when said plate is in said non-removable position.

2. The structure of claim 1 in which said confining means includes wall portions on said one leg about said recess for overlying said plate when the same has been rotated into non-removable position.

3. The structure of claim 1 in which said confining means includes a zonal portion on said pin, said plate being equipped with an aperture to pass over said zonal portion.

4. A pin locking assembly comprising a member providing opening means therein for the receipt of a pin, a pin mounted in said opening means, cooperating means on said member preventing rotation of said pin, a plate rotatably mounted on the other pin end for movement between removable and non-removable positions, and removable axially extending lug means releasably fixing said plate in said non-removable position.

5. A pin locking assembly comprising a unitary U-shaped member providing first and second legs, aligned openings in said legs for the receipt of a pin, a generally cylindrical pin mounted in said openings and equipped with a head at one pin end received in said first leg opening, said pin head and first leg opening being contoured to prevent rotation of said pin when the same is installed in said aligned openings, the other pin end being equipped with an integral reduced diameter neck terminating in an integral zonal portion, a plate centrally apertured to pass said zonal portion and rotate on said neck from a removable position to a non-removable position, and removable lock means fixing said plate in non-removable position.

6. The structure of claim 5 in which said plate is equipped with a second aperture for the receipt of said lock means, said lock means including a lug equipped with a detachable ring, said second leg being equipped with a passage accommodating said lug with said ring attached thereto.

7. The structure of claim 5 in which said passage is equipped with a slot adapted to support said ring prior to insertion thereinto of said lug.

8. The structure of claim 7 in which said passage is tapered to accommodate insertion of a wedge-shaped tool to bear against the end of said lug to detach said ring therefrom.

9. The structure of claim 7 in which said passage is extended through said second leg to accommodate removal of said lug from said ring.

10. A pin locking assembly comprising a unitary U-shaped member providing first and second legs, aligned openings in said legs for the receipt of a pin, a generally cylindrical pin mounted in said openings and equipped with a head at one pin end received in said first leg opening, said pin head and first leg opening being contoured to prevent rotation of said pin when the same is installed in said aligned openings, said first leg being equipped with spaced wall portions on the side thereof remote from said second leg and defining an entrance for an obround plate, an obround plate positioned in the space between said wall portions and said first leg and rotatable therein to non-removal position to confine said pin from removal from said openings, and removable lug means extending axially of said pin and through said plate.

* * * * *